(12) United States Patent
Hofmann (10) Patent No.: US 8,631,476 B2
(45) Date of Patent: Jan. 14, 2014

(54) DATA PROCESSING SYSTEM INCLUDING EXPLICIT AND GENERIC GRANTS OF ACTION AUTHORIZATION

(75) Inventor: Christoph H. Hofmann, Wiesloch (DE)

(73) Assignee: SAP AG, Walldorf (DE)

( * ) Notice: Subject to any disclaimer, the term of this patent is extended or adjusted under 35 U.S.C. 154(b) by 1617 days.

(21) Appl. No.: 11/095,301

(22) Filed: Mar. 31, 2005

(65) Prior Publication Data

US 2006/0230281 A1 Oct. 12, 2006

(51) Int. Cl.
*G06F 21/00* (2013.01)

(52) U.S. Cl.
USPC .................................................. 726/6

(58) Field of Classification Search
USPC .......................................... 713/182; 726/4, 6
See application file for complete search history.

(56) References Cited

U.S. PATENT DOCUMENTS

| | | | |
|---|---|---|---|
| 6,236,996 B1 * | 5/2001 | Bapat et al. ........................ 707/9 |
| 6,308,274 B1 | 10/2001 | Swift | |
| 6,466,932 B1 | 10/2002 | Dennis et al. | |
| 7,107,610 B2 | 9/2006 | Lortz | |
| 2001/0047485 A1 | 11/2001 | Brown et al. | |
| 2002/0083059 A1 | 6/2002 | Hoffman et al. | |
| 2002/0108057 A1 | 8/2002 | Wu et al. | |
| 2003/0023874 A1 * | 1/2003 | Prokupets et al. ............ 713/201 |
| 2003/0055704 A1 | 3/2003 | Reece | |
| 2003/0074580 A1 | 4/2003 | Knouse et al. | |
| 2003/0088786 A1 * | 5/2003 | Moran et al. ................... 713/201 |
| 2003/0200467 A1 * | 10/2003 | Choy et al. ..................... 713/202 |
| 2004/0088560 A1 | 5/2004 | Danks | |
| 2004/0216150 A1 | 10/2004 | Scheifler et al. | |
| 2004/0243822 A1 | 12/2004 | Buchholz et al. | |
| 2006/0230281 A1 | 10/2006 | Hofmann | |
| 2008/0114769 A1 | 5/2008 | Buchholz et al. | |

FOREIGN PATENT DOCUMENTS

EP 0 697 662 A1 2/1996

OTHER PUBLICATIONS

Access control: principles and solutions by Software—Practice and Experiene (SP&E) Sabrina De Capitani di Vimercati et al. Pulised by John Wiley &Sons 2003.*
Ravis S. Sandhu and Pierangela Samarati, "Access Control: Principles and Practice", 2460 IEEE Communications Magazine, 32(Sep. 1994), No. 9, New York, US, XP000476554, p. 40-49 (9pgs.).

* cited by examiner

*Primary Examiner* — Ellen Tran
(74) *Attorney, Agent, or Firm* — Buckley, Maschoff & Talwalkar LLC (57) ABSTRACT

A method of determining whether to authorize a user of a computer system to perform an action in the computer system is described. Besides the explicit authorization grants, a new, more secure semantics is defined where only unassigned users or actions are granted generically. For example, if an access control list for an action is not empty, a user may be authorized to perform the action only if the user is a member of the access control list for the action. If the access control list for the action is empty, the user may be authorized to perform the action only if the user is not a member of any access control list of a group of access control lists.

12 Claims, 9 Drawing Sheets

DATA PROCESSING SYSTEM INCLUDING EXPLICIT AND GENERIC GRANTS OF ACTION AUTHORIZATION

TECHNICAL FIELD

The present invention relates to granting system users authorizations to perform actions in a data processing system.

BACKGROUND

Security is a vital concern in the design and operation of computer systems. One important aspect of computer system security lies in software that assures that actions such as accessing data resources are only performed by the specific users who are intended to be authorized to perform the actions.

Figure 1:
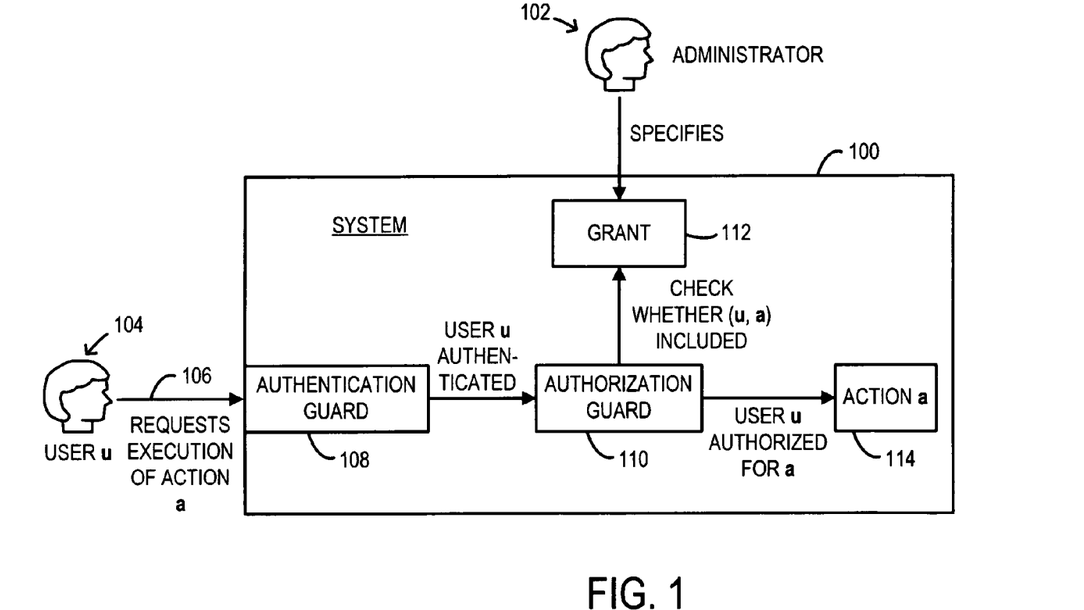
FIG. 1 depicts a model of how user authorization software may operate in some systems.

FIG. 1 depicts a model of how user authorization software may operate in some systems.

In FIG. 1, block 100 represents a computer system, including hardware and software (the hardware and software are not separately shown, except that some functional aspects of the software are represented by blocks presented within block 100). A human administrator of the system 100 is represented at 102, and a particular user (u) of the system is represented at 104. When the user u 104 wishes to perform an action a (e.g., accessing his/her electronic mail mailbox), he/she provides input 106 to the system 100 to request execution of the action. An authentication guard software module 108 may be provided to authenticate the identity of user u 104. For example, the authentication guard software module may require the user u 104 to complete a password-protected log-on procedure.

Once the authentication guard software module 108 has authenticated the identity of user u 104, the request 106 is turned over to an authorization guard software module 110 for a determination as to whether the user u is authorized to have the requested action a performed. The authorization guard software module 110 may make the determination by referring to a grant relation Grant (reference numeral 112) that has previously been specified by the system administrator 102.

The grant relation Grant may be defined in accordance with the following semantic model.

The grant relation Grant may be a subspace of the space $U \times A$, i.e.:

$$\text{Grant} \subset U \times A,$$

where:

U is a set of users of the computer system 100 (e.g., all authorized users); and A is a set of actions that may be performed in the computer system 100 (e.g., the set of all actions for which execution is to be restricted).

If and only if a user $u \in U$ is in the grant relation with action $a \in A$, i.e. $(u,a) \in$ Grant, then user u is authorized to execute action a by the grant relation, otherwise user u is not authorized to execute action a.

In other words, $(u,a) \in$ Grant $\Leftrightarrow$ u is authorized for a.

In many cases an action a is an access to a resource in the computer system, and accordingly the action may be represented by the resource itself. Correspondingly, access control may be specified by a grant relation between the set of users and a certain set of resources. In some descriptions, users and resources may be called subjects and objects.

The grant relation of a complex system may be composed of a number (potentially a large number) of orthogonal subrelations $\text{Grant}_i$, where each subrelation has the same user set U but orthogonal or disjunct sets of actions $A_i$. In such cases, each subrelation can be separately specified and treated individually, as indicated below:

$$A = A_1 \cup A_2 \cup \ldots \cup A_n$$

$$\text{Grant}_i \subset U \times A_i$$

$$\text{Grant} = \text{Grant}_1 \cup \text{Grant}_2 \cup \ldots \cup \text{Grant}_n$$

Often, the overall grant relation is composed of subrelations where each set $A_i$ contains all actions of the same type, e.g. read accesses to all files existing in the system. As each action generally is an operation dealing with an object that is part of the system, each set $A_i$ can also be identified by the set of all existing objects of a certain type, e.g. all the existing files. Such subrelations may be referred to as atomic grant relations.

Since an overall grant relation is uniquely identified by its subrelations, for simplicity of explanation it may be assumed in some cases that Grant is atomic so that the set of actions A only contains actions of the same type. In such a case, set A may have a bijectively associated set of objects that the actions operate on.

Referring again to FIG. 1, the authorization guard 110 checks to see whether $(u,a) \in$ Grant, and if so authorizes the user u to execute the action a, which is represented at 114 in FIG. 1. As noted above, the action a may correspond to an object such as a file for which the user u has requested access.

Figure 2:
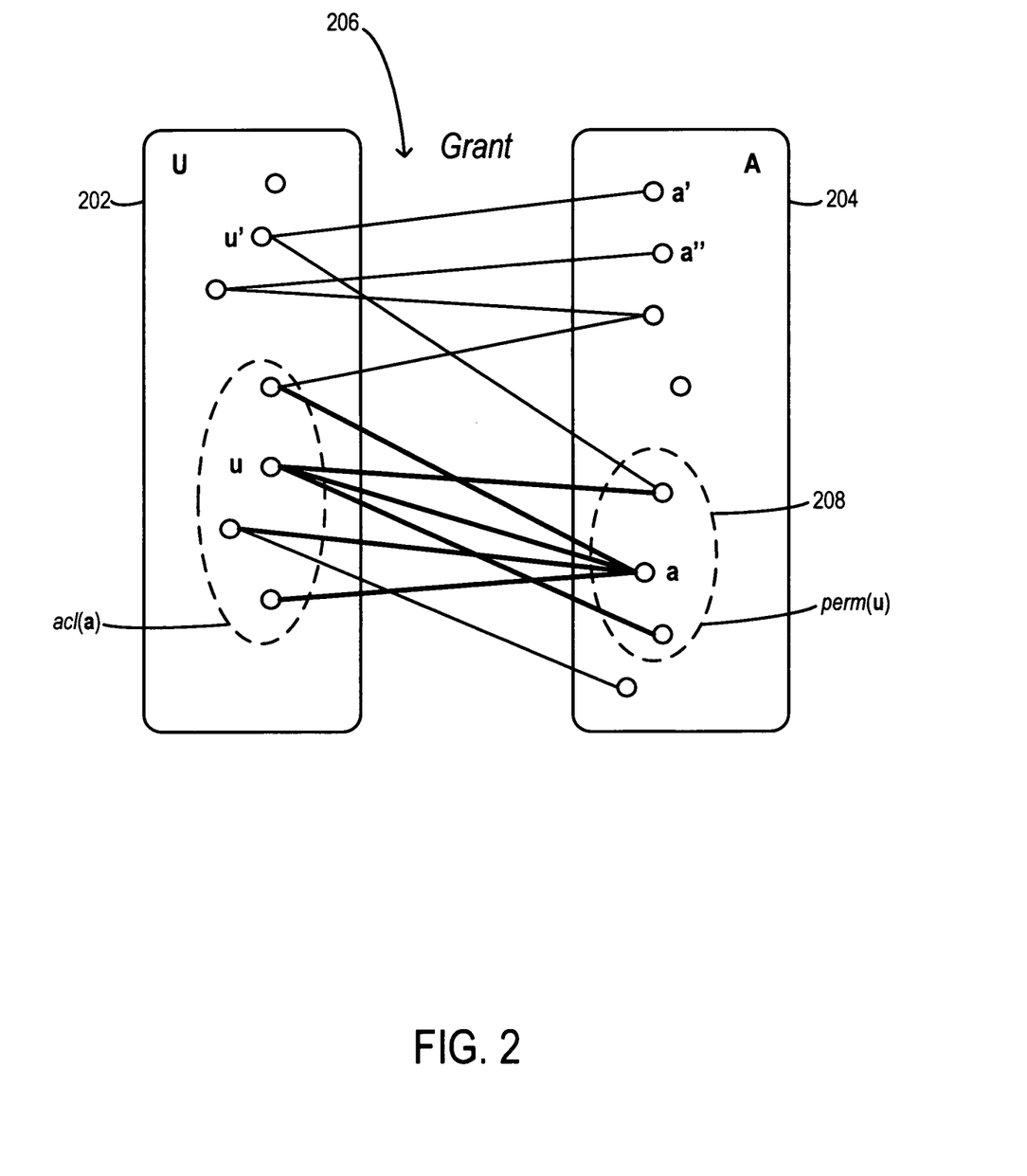
FIG. 2 schematically illustrates an example of an authorization grant relation that may be employed with the user authorization software depicted in FIG. 1.

FIG. 2 schematically illustrates an example of Grant. In FIG. 2, the rounded-corner rectangle 202 represents set U of users, and each small circle within 202 represents a user $u_i \in U$. The rounded-corner rectangle 204 represents set A of actions, and each small circle within 204 represents an action $a_i \in A$. The lines 206 between 202 and 204 represent pairs $(u_i, a_i) \in$ Grant. Thus, in the illustrated example, $(u',a') \in$ Grant (user u' is authorized to perform action a'), but $(u',a'') \notin$ Grant (user u' is not authorized to perform action a'').

In practice, a grant relation Grant $\subset U \times A$ may be specified by the system administrator in two alternative ways: by user permissions or by access control lists (ACLs). Such approaches may be more practical than, say, enumerating all tuples (u,a) belonging to the grant relation.

User permissions assign to each user the set of the user's authorized actions. User permissions may be modeled by a specification function perm with the functional signature $$\text{perm}: U \to P(A),$$

where P(A) denotes the power set of A.

The set perm(u) may be referred to as the permission set of u.

Assuming that only permission sets are used to specify Grant, then the specification function perm induces Grant, which is also written as [[perm]], the semantics of perm as follows:

$$[[\text{perm}]] = \text{Grant, with } a \in \text{perm}(u) \Leftrightarrow (u,a) \in [[\text{perm}]] \qquad (1)$$

Actions may be assigned to permission sets indirectly. For example, a role may be assigned to a user, with one or more allowed actions contained within the assigned role. In any case, user permissions may be semantically modeled by assigning actions to users in the course of a user administration function.

Referring again to FIG. 2, the dashed line oval 208 represents the subset of A which is the permission set of user u (perm(u)), which contains exactly the actions that have been authorized to user u.

ACLs operate in the opposite direction of the grant relation as compared to user permissions. ACLs assign to each action the set of users authorized to execute the action. ACLs may be modeled by a specification function ac with the functional signature $$acl: A \rightarrow P(U)$$

The set acl(a) may be referred to as the access control list of a.

Assuming that only ACLs are used to specify Grant, then the specification function ad induces Grant, which is also written as [[acl]], the semantics of acl as follows:

$$[[acl]] = \text{Grant, with } u \in acl(a) \Leftrightarrow (u,a) \in [[acl]] \qquad (2)$$

As with assignment of actions to permission sets, assignment of users to ACLs may be done indirectly. For example, a user group may be assigned to an action (or, e.g., to access the object that corresponds to the action), thereby granting permission to execute the action to each user that is a member of the user group. In any case, ACLs may be semantically modeled by assigning users to actions or to objects that correspond to the actions.

User permissions and ACLs directly model the grant relation. The grant relation can be immediately specified by the specification functions perm and acl, as indicated by the definitions set forth above. Thus perm or acl, as the case may be, positively specifies the grant relation, which may be a relatively intuitive way of specifying the grant relation, as contrasted with a negative specification of the grant relation based on grant restrictions. Another advantage of the positive specification of the grant relation via perm or acl, is that this approach may comport with greater security, since no action is allowed at the outset. Rather, particular grants of authorization are added one after another in the course of specifying the grant relation so that the basically restricted model is opened up step by step. In contrast, an approach for negatively specifying the grant relation entails an open model, in which every action is allowed in the absence of specification or when a generic construct like a wildcard is used; this may be considered less secure than the positive specification approach. However, the negative specification approach may be appropriate when most grants are not critical, but a certain limited number of grants need to be restricted/disallowed.

The discussion will now turn to the relationship of the specification functions perm and acl in the case where the same grant relation is to be specified. This relationship can be expressed logically as follows:

$$[[perm]] = [[acl]] \Leftrightarrow ((u,a) \in [[perm]] \Leftrightarrow (u,a) \in [[acl]])$$

It follows from statements (1) and (2) above that $$[[perm]] = [[acl]] \Leftrightarrow (a \in perm(u) \Leftrightarrow u \in acl(a)) \qquad (3)$$

This is as would be expected. Action a is effectively contained in the permission set of u if and only if u is effectively contained in the access control list of action a.

When implementing an authorization concept for an atomic grant relation, there are two main issues to consider, namely (a) what tool is to be used to specify the grant relation and (b) how the authorization check is to be performed by the authorization guard. As has been indicated above, user permissions and ACLs for atomic grant relations are semantically equivalent specification approaches. Thus either one can be used in practical implementations.

ACLs require that the actions in question be assigned to a set of predefined objects with predefined operations. These objects may be at different levels of abstraction, where a corresponding program or system has defined the access to the objects. Examples of such objects are files of an operating system or URLs (universal resource locators) for which access is defined by a web server.

In contrast, user permissions rely on the existence of a user administration system which typically is present in a non-trivial computer system. The user administration system may be available in the operating system or in the platform itself.

ACLs are typically stored together with other properties of an object to which the action a corresponds. User authorization in the case of ACLs may be checked at runtime by searching for the requesting user u in acl(a) whenever u requests execution of action a.

Correspondingly, permission lists are typically stored in the system's user administration facility. User authorization in the case of user permissions may be checked at runtime by searching for action a in perm(u) whenever u requests execution of action a.

Since both user permissions and ACLs are semantically equivalent, it is conventionally the case that the two are not used in parallel for the same atomic grant relation. To do so would require redundant storage of the grants and would entail synchronization of the user permissions and the ACLs, as implied by statement (3) above. That is, if both user permissions and ACLs were used in parallel, whenever action a is added to or deleted from perm(u) in the user administration facility, the corresponding action would have to be taken with respect to u vis a vis acl(a) in the assigned object administration facility for action a. The user administration facility and the object storage facility are typically accessed with different tools, so that parallel usage of user permissions and ACLs would require additional effort without any improvement in functionality. To the contrary, the usage of both specification approaches in parallel would provide additional targets for would-be attackers, and thus would tend to decrease the security of the grant relation.

In a typical computer system of any size the complete grant relation may consist of a considerable number of atomic grant relations. Since one dimension of each atomic grant relation is always the set of users, and since user administration is generally available within such a computer system, it is common to use user permissions to define the atomic grant relations. This may be advantageous in that it reuses the user administration facility.

In some computer systems, user permissions may be used to specify some atomic grant relations, and ACLs may be used to specify other atomic grant relations. For example, roles may be assigned to users, where the roles incorporate permissions across a variety of different types of actions. Flexible permissions may be implemented with use of wildcards or the like in the specification of the authorized actions.

However, for a subset of atomic grant relations, ACLs may be used in parallel with general user permissions. One advantage of supplementing general user permissions with ACLs is that the ACLs may be more intuitive and may be focused on only one particular atomic grant relation with a particular kind of objects. For example, the objects may belong to the domain of a particular application program, with each object denoting an individual entity. In such cases it may not be practical to assign authorizations for the objects with user roles, since the grants of authorizations for the objects must be specified object by object. Use of ACLs in these cases may provide enhanced security, because the ACL for a new object is typically empty, and the possibility of incorrect authorizations for the new object is reduced or eliminated. Also the objects and their actions are likely to be well-understood so that the model for authorizing access to the object also is likely to be well-understood.

However, the above described grant relation semantic system may not be very well suited to a situation in which it becomes necessary to supplement an implicitly established open authorization system (in which virtually all actions are permitted) with addition of one or more new sets of actions for which explicit restrictions/permissions may be needed.

SUMMARY

Pursuant to some embodiments, a system, method, apparatus, means and computer program code are provided to determine whether to authorize a user of a computer system to perform an action in the computer system. If an access control list for the action is not empty, the user is authorized to perform the action only if the user is a member of the access control list for the action. If the access control list for the action is empty, the user is authorized to perform the action only if the user is not a member of any access control list of a group of access control lists.

In another aspect, if a user's permission set with respect to an atomic set of actions is not empty, the user is authorized to perform the action only if the action is a member of the permission set for the user. If the permission set for the user is empty, the user is authorized to perform the action only if the action is not a member of any permission set of a group of permission sets.

In another aspect, a system, method, apparatus, means and computer program code are provided to define an authorization grant relation in a computer system between a set of users of the computer system and a set of actions. A first subset of the set of actions is defined. Each action in the first subset has at least one user specifically authorized to perform the action. A first subset of the set of users is defined. The first subset of the set of users consists of every user specifically authorized to perform at least one action of the set of actions. A second subset of the set of actions is defined. The second subset consists of every action of the set of actions that is not included in the first subset of the set of actions. A second subset of the set of users is defined. The second subset of the set of users consists of every user of the set of users that is not included in the first subset of the set of users. Every user of the second subset of the set of users is granted authorization to perform every action of the second subset of the set of actions.

In another aspect, a system, method, apparatus, means and computer program code are provided to determine whether to authorize a user of a computer system to perform an action in the computer system. The user is authorized to perform the action if the action is a member of a permission set for the user. Alternatively, the user is authorized to perform the action if the permission set for the user includes a wildcard designation and the action is not a member of any permission set of a group of permission sets. In all other cases, authorization for the user to perform the action is refused.

In another aspect, the user is authorized to perform the action if the user is a member of an access control list for the action. Alternatively, the user is authorized to perform the action if the access control list for the action includes a wildcard designation and the user is not a member of any access control list of a group of access control lists. In all other cases, authorization for the user to perform the action is refused.

In another aspect, a system, method, apparatus, means and computer program code are provided to define an authorization grant relation in a computer system between a set of users of the computer system and a set of actions. A first subset of the set of actions is defined. Each action in the first subset has at least one user specifically authorized to perform the action. A second subset of the set of actions is defined. The second subset consists of every action of the set of actions that is not included in the first subset of the set of actions. Besides explicit authorization, authorization is granted to perform every action of the second subset of actions to every user for which a corresponding permission set includes a wildcard designation.

In another aspect, a first subset of the set of users is defined. Each user in the first subset has at least one action that the user in question is specifically authorized to perform. A second subset of the set of users is defined. The second subset consists of every user of the set of users that is not included in the first subset. Besides explicit authorization, authorization is granted to every user of the second subset to perform every action for which a corresponding access control list includes a wildcard designation.

With these and other advantages and features that will become hereafter apparent, a more complete understanding of the nature of the invention can be obtained by referring to the following detailed description and to the drawings appended hereto.

DETAILED DESCRIPTION

To alleviate problems inherent in the prior art, some embodiments of the present invention introduce systems, methods, computer program code and means for explicitly specifying some user authorizations while also maintaining an implicit open authorization model with respect to other aspects of the system. The authorization model is implemented with a novel authorization semantics system that will be referred to as "dedicated authorizations". Either dedicated permissions or dedicated ACLs may be used to define restrictions for certain actions/users, while leaving an implicitly defined open authorization model operative with respect to other actions/users.

Figure 3:
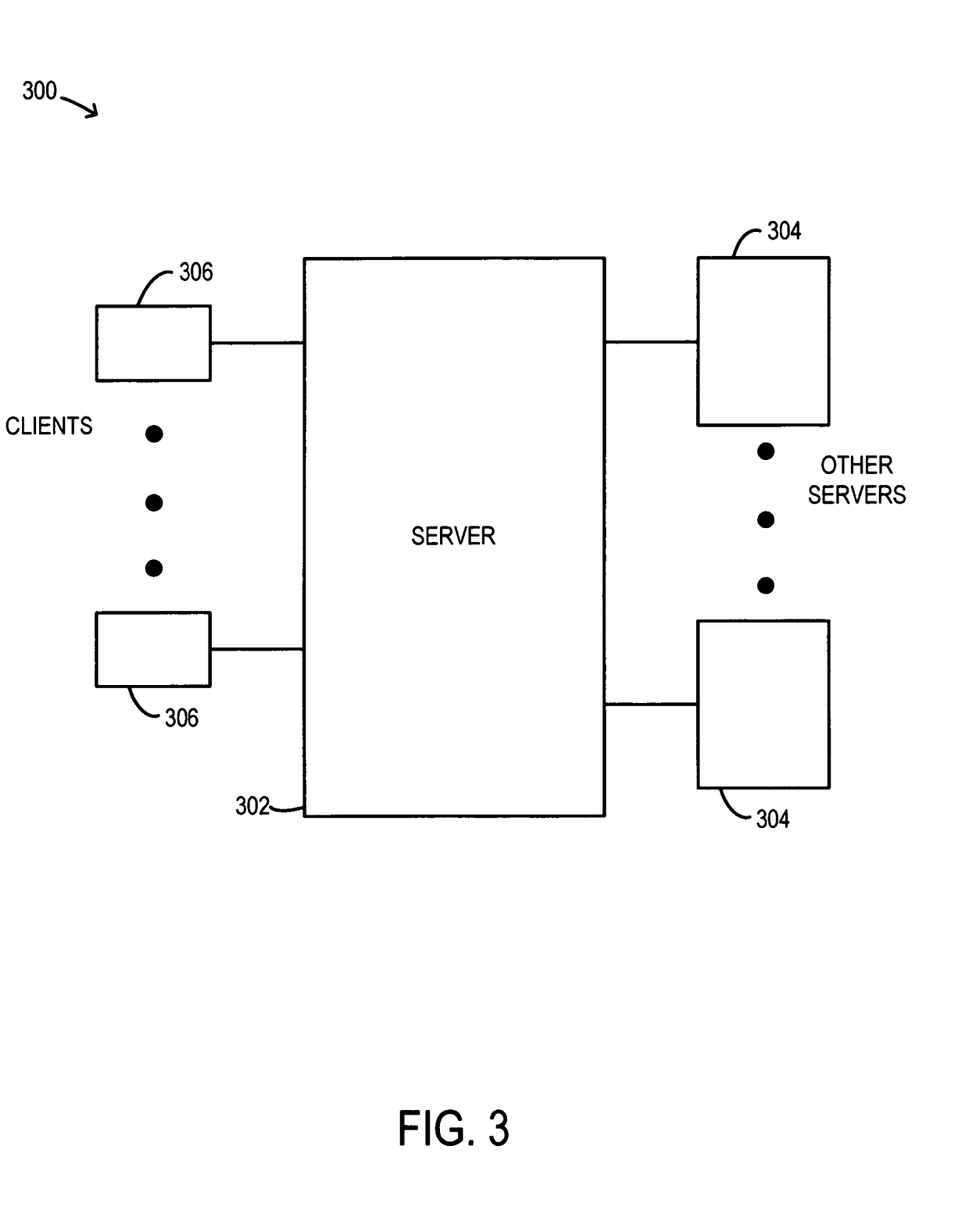
FIG. 3 is a block diagram of a computer system in which some embodiments may be implemented.

FIG. 3 is a block diagram of a computer system 300 in which some embodiments may be implemented. The computer system 300 includes a server computer 302. The server computer 302 performs various functions, including authentication of users and authorization of users to execute certain actions, in accordance with a dedicated authorizations model. The overall authorization procedure may be like that illustrated in FIG. 1.

The computer system 300 may also include one or more additional server computers 304 which are in communication with the server computer 302 (or may be in communication with the server computer 302 from time to time). Requests for execution of actions may be communicated from the other servers 304 to the server computer 302 and may be allowed or refused in accordance with authorization procedures to be described below.

In addition, the computer system 300 may include one or more client computers 306 (e.g., personal computers, laptop computers, etc.). The client computers 306 may be in communication with the server computer 302, at least from time to time. Each client computer 306 may be used by one or more users of the computer system 300. The users may use the client computers 306 to request execution of actions in the server computer 302. These requests, too, may be allowed or refused in accordance with authorization procedures to be described below.

Figure 4:
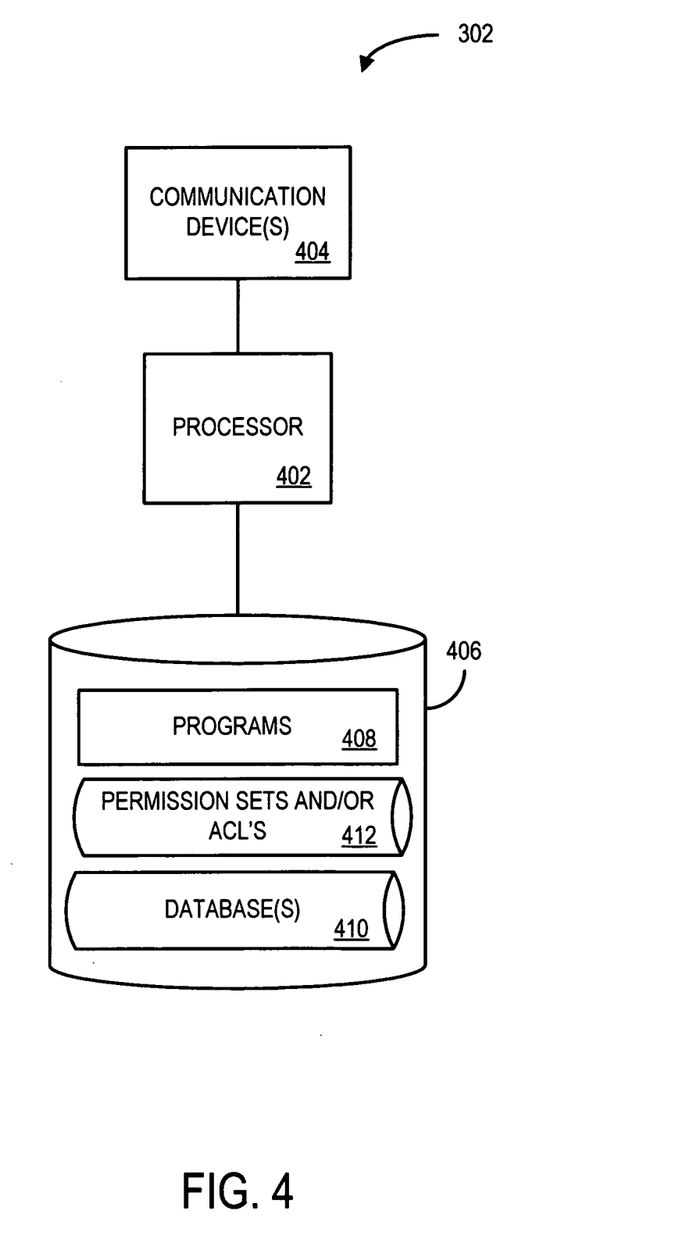
FIG. 4 is a block diagram of a server computer that is part of the computer system of FIG. 3.

FIG. 4 is a block diagram of the server computer 302. As depicted, the server computer 302 includes a computer processor 402 operatively coupled to a communication device 404 and a storage device 406. The computer processor 402 may be a single microprocessor or may comprise two or more microprocessors operating cooperatively and/or in parallel. The communication device 404 may be used to communicate, for example, with other devices such as the other server computers 304 and the client computers 306. The communication device 404 may include one or more data communication ports. The server computer 302 may also include one or more input devices and output devices, which are not shown, and which may include conventional devices such as a display, a keyboard and a mouse.

Storage device 406 may comprise any appropriate information storage device, including combinations of magnetic storage devices (e.g., magnetic tape and hard disk drives), optical storage devices, and/or semiconductor memory devices such as random access memory (RAM) devices and read only memory (ROM) devices.

Storage device 406 stores one or more programs 408 for controlling processor 402. Processor 402 performs instructions of programs 408, and thereby operates in accordance with the present invention. For example, the programs 408 may include user authentication and authorization software modules. The authorization software module, in particular, may operate in a manner to be described below.

Storage device 406 also may store one or more databases 410 for storing data objects used by one or more application programs included in the programs. Further, storage device 406 stores either or both of permission sets and ACLs (indicated at 412) that are used in connection with the dedicated authorizations semantics system referred to above and described in more detail below. The authorization software module may refer to the permission sets and/or ACLs in determining whether to allow actions requested by users of the computer system 100.

In the semantics system for dedicated permissions, the permission function $[[\text{perm}]]_{ded}$ is defined in contrast to the permission function $[[\text{perm}]]$ described above. Given a permission function $[[\text{perm}]]$, four disjunct sets DU, CU, DA and CA can be defined. DU and CU are subsets of the set U of users, and DA and CA are subsets of the set A of actions. DU may be referred to as the set of dedicated users because the grant relation is explicitly specified for each user in DU. CU may be referred to as the set of unassigned users. DU may be defined as follows:

$$DU = \{u \in U | \text{perm}(u) \text{ is not empty}\} \quad (4)$$

That is, DU consists of all users in U that are specifically authorized to perform an action a in A.

CU may be defined as follows:

$$CU = U \setminus DU \quad (5)$$

That is, CU is the set of all users in U that are not members of DU (or CU is the complement of DU in U).

Accordingly, DA denotes the set of actions that are explicitly assigned by perm and CA is the complement of DA. DA may be referred to as the set of dedicated actions because there is an explicitly defined authorization relation for each action in DA. CA may be referred to as the set of unassigned actions.

Thus, DA may be defined as follows:

$$DA = \{a \in A | \exists u \in U \text{ with } a \in \text{perm}(u)\} \quad (6)$$

That is, DA is the set of all actions in A that are members of the permission set of at least one user u in U. In other words, DA consists of all actions having at least one user specifically authorized to perform the action in question.

CA may be defined as follows:

$$CA = A \setminus DA \quad (7)$$

With the four sets DU, CU, DA and CA as defined above, the following assertions hold:

$$[[\text{perm}]] \cap (DU \times DA) = [[\text{perm}]]$$

$$[[\text{perm}]] \cap (CU \times DA) = \emptyset$$

$$[[\text{perm}]] \cap (DU \times CA) = \emptyset$$

$$[[\text{perm}]] \cap (CU \times CA) = \emptyset$$

The function $[[\text{perm}]]_{ded}$ may be defined by adding to $[[\text{perm}]]$ all possible grants between unassigned users and unassigned actions. That is, $$[[\text{perm}]]_{ded} = [[\text{perm}]] \cup (CU \times CA) \quad (8)$$

Consequently, in the dedicated permissions semantics system the specification function consists of an explicit part $[[\text{perm}]]$ with restricted semantics and an additional implicit part $(CU \times CA)$. In effect, the open model $(CU \times CA)$ for unassigned entities (unassigned users and actions) enhances $[[\text{perm}]]$, and the closed model is retained for $(CU \times DA)$ and $(DU \times CA)$, in accordance with the restricted nature of $[[\text{perm}]]$.

It should be noted that in cases where perm is empty (i.e., where $\text{perm}(u) = \emptyset$ for each $u \in U$) then the grant relation is the open model, with $[[\text{perm}]]_{ded} = U \times A$, since in these cases CU=U and CA=A.

Figure 5:
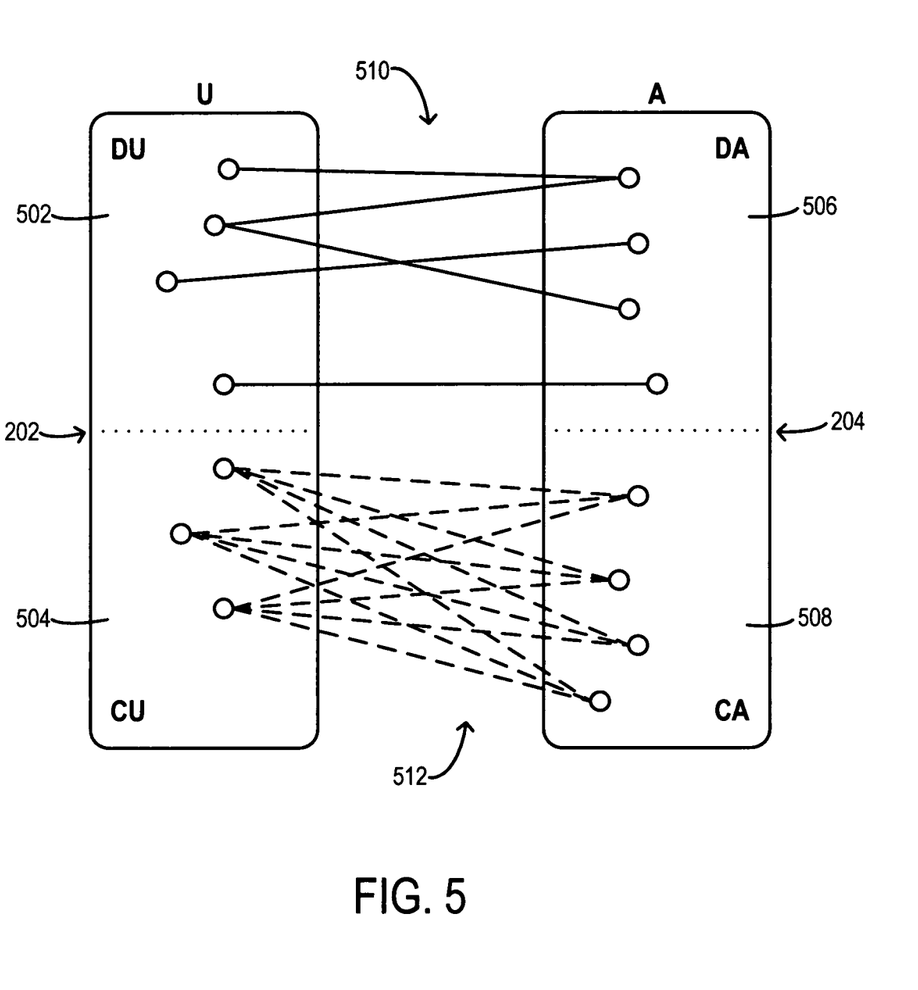
FIG. 5 schematically illustrates an example of an authorization model provided in accordance with some embodiments in the computer system of FIG. 3.

FIG. 5 schematically illustrates an example of $[[\text{perm}]]_{ded}$, with $[[\text{perm}]]$ not empty.

As in FIG. 2, U is indicated at 202, and A is indicated at 204. DU is indicated at 502, CU is indicated at 504, DA is indicated at 506 and CA is indicated at 508. The solid lines at 510 between users in DU and actions in DA represent $[[\text{perm}]]$, and the dashed lines at 512 represent the implicit part $(CU \times CA)$ of $[[\text{perm}]]_{ded}$.

In the semantics system for dedicated ACLs, the function $[[\text{acl}]]_{ded}$ is defined as an augmentation of $[[\text{acl}]]$. Again, given $[[\text{acl}]]$ four disjunct sets DU, CU, DA and CA are defined. The definitions are:

$$DA = \{a \in A | \text{acl}(a) \text{ is not empty}\} \quad (9)$$

$$CA = A \setminus DA \quad (10)$$

$$DU = \{u \in U | \exists a \in A \text{ with } u \in acl(a)\} \quad (11)$$

$$CU = U \setminus DU \quad (12)$$

Based on these definitions, the following assertions hold:

$$[[acl]] \cap (DU \times DA) = [[acl]]$$

$$[[acl]] \cap (CU \times DA) = \emptyset$$

$$[[acl]] \cap (DU \times CA) = \emptyset$$

$$[[acl]] \cap (CU \times CA) = \emptyset$$

The function $[[acl]]_{ded}$ may be defined by adding to $[[acl]]$ all possible grants between unassigned users and unassigned actions. That is, $$[[acl]]_{ded} = \cup (CU \times CA) \quad (13)$$

Again, if acl is empty, the result is an open model with $[[acl]]_{ded} = U \times A$.

Considering now the semantical connection between the specification techniques perm and acl, it can be demonstrated that $$[[perm]] = [[acl]] \Rightarrow [[perm]]_{ded} = [[acl]]_{ded} \quad (14)$$

A proof of statement (14) follows.

We start with $[[perm]] = [[acl]]$. The functions $[[perm]]_{ded}$ and $[[acl]]_{ded}$ are defined by using the four sets DU, CU, DA and CA that are constructed using perm and acl, correspondingly. To distinguish the sets constructed respectively via perm and ac, we distinguish between $DU_{perm}$, $CU_{perm}$, $DA_{perm}$, $CA_{perm}$ and $DU_{acl}$, $CU_{acl}$, $DA_{acl}$, $CA_{acl}$, respectively. Then the following equation holds:

$$\begin{aligned}
DU_{perm} &= \{u \in U \mid perm(u) \text{ is not empty}\} & \text{(from statement (4))} \\
&= \{u \in U \mid \exists a \in A \text{ with } a \in perm(u)\} & \text{(from } [[perm]] = \\
& & [[acl]], \text{ and using} \\
& & \text{statement (3)} \\
&= \{u \in U \mid \exists a \in A \text{ with } u \in acl(a)\} = DU_{acl} & \text{(from statement (11))}
\end{aligned}$$

The validity of the following equation can also be demonstrated.

$$\begin{aligned}
DA_{acl} &= \{a \in A \mid acl(a) \text{ is not empty}\} & \text{(from statement (9))} \\
&= \{a \in A \mid \exists u \in U \text{ with } u \in acl(a)\} & \text{(from } [[perm]] = \\
& & [[acl]], \text{ and using} \\
& & \text{statement (3)} \\
&= \{a \in A \mid \exists u \in U \text{ with } a \in perm(u)\} = DA_{perm} & \text{(from statement (6))}
\end{aligned}$$

These two equations imply, from statements (5), (7), (10) and (11), that $$CU_{perm} = CU_{acl} \text{ and}$$

$$CA_{perm} = CA_{acl}$$

This completes the proof in view of statements (8) and (13). It is noted that it is not the case that $$[[perm]]_{ded} = [[acl]]_{ded} \Rightarrow [[perm]] = [[acl]]$$

This is because different specifications for the authorization grant relation may have the same dedicated semantics.

For example U×A is the dedicated semantics of an empty acl function and also is the dedicated semantics of a complete perm function that assigns all actions to every user.

An alternative, ordinary open semantic model would simply assign to each user in CU or to each action in CA all actions in the atomic action set A or all users in the user set U, respectively, to define a generic star semantics. Denoting such semantics as $[[perm]]_{open}$ or $[[acl]]_{open}$, respectively, these semantics would include additional subrelations as follows:

$$[[perm]]_{open} = [[perm]]_{ded} \cup (CU \times DA)$$

$$[[acl]]_{open} = [[acl]]_{ded} \cup (DU \times CA)$$

From a security point of view, this extension is critical: An action in DA dedicated to some users in DU via perm would also be granted for all non-dedicated users in CU. Correspondingly, a user in DU dedicated to some actions in DA via acl would also be allowed to execute all non-dedicated actions in CA. Furthermore, the open semantic model would break the symmetry between perm and acl. Moreover, it would not be adequate to further include (DU×CA) in $[[perm]]_{open}$ or (CU×DA) in $[[acl]]_{open}$, since this would extend the actual specified authorizations for the dedicated users and dedicated actions themselves.

There will now be described algorithms for checking actual authorization grants when dedicated authorizations are implemented with either dedicated permissions or dedicated ACLs.

Figure 6:
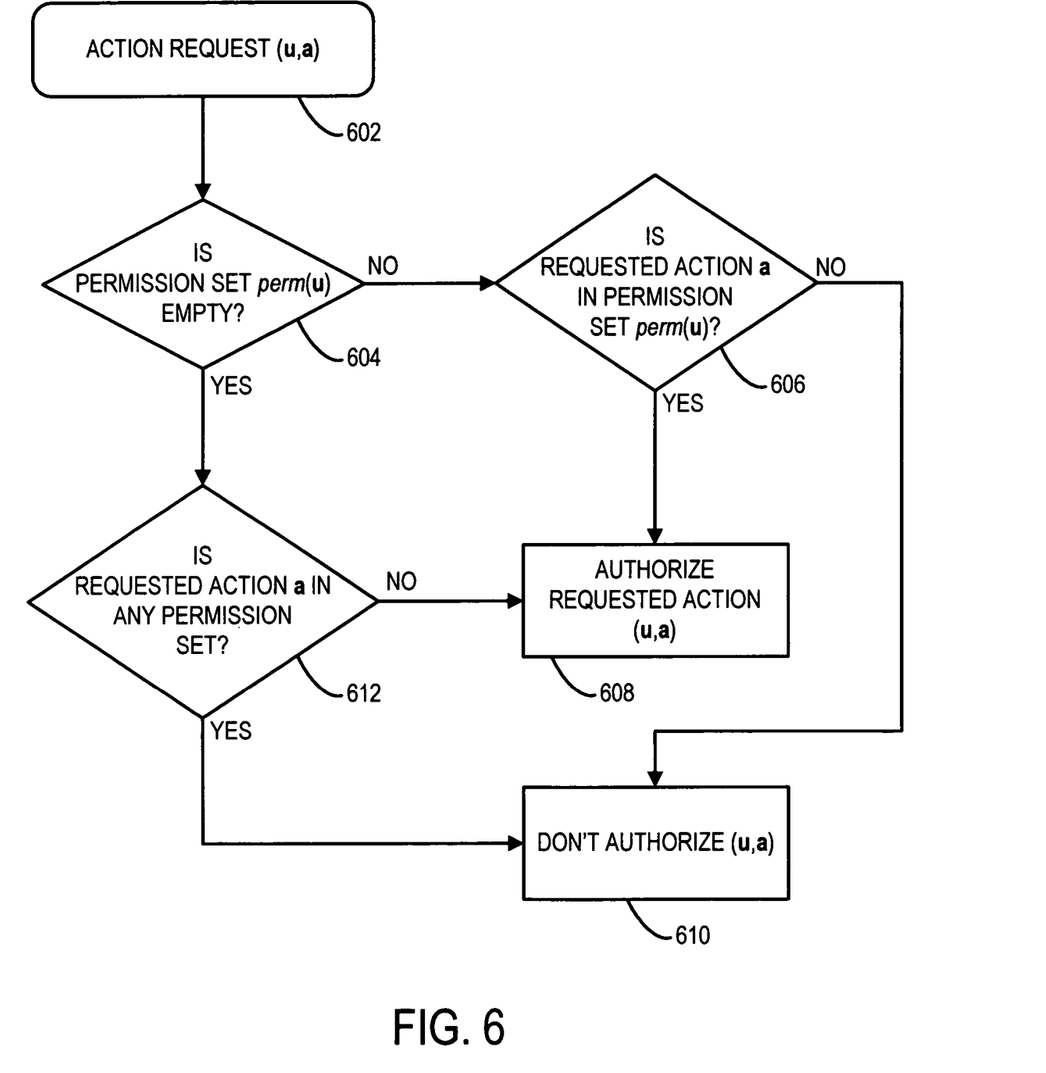
FIG. 6 is a flow chart that illustrates a process performed in the computer system of FIG. 3 in accordance with some embodiments.

FIG. 6 is a flow chart that illustrates a procedure for determining whether an action a requested by a user u is authorized in the case where dedicated permissions are implemented.

That is, the procedure of FIG. 6 determines whether the relation (u,a) is either explicitly or implicitly included in the grant relation (or the pertinent atomic grant relation) specified in the server computer 302. Block 602 in FIG. 6 represents submission to the server computer 302 by a user u (either human or software based, either via a client computer or another server) of the request (u,a). At 604 it is determined whether the permission set of u is empty. If the permission set of u is not empty, then it is determined at 606 whether the requested action a is included in the permission set of u. If so, then the requested action a is authorized (608). If not, the requested action a is not authorized (610).

If the permission set of u is empty, then it is determined at 612 whether the requested action a is an unassigned action (i.e., it is determined whether a is a member of any permission set (possibly any set of a group of permission sets)). If a is unassigned then the requested action a is authorized (608). However, if a is assigned to some permission set (or some permission set of a relevant group of permission sets), then a is not authorized (610).

Figure 7:
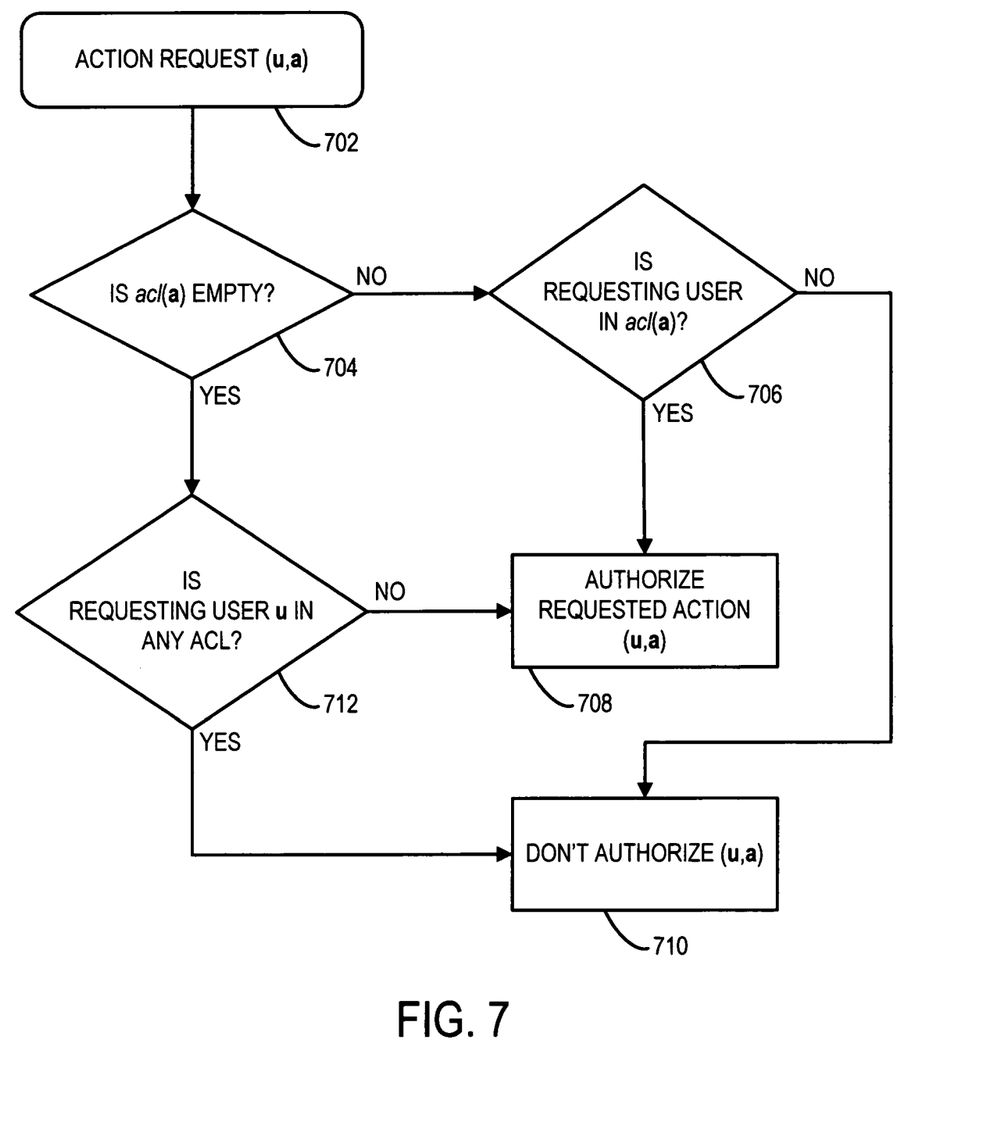
FIG. 7 is a flow chart that illustrates a process performed in the computer system of FIG. 3 in accordance with other embodiments.

FIG. 7 is a flow chart that illustrates a procedure for determining whether an action a requested by a user u is authorized in the case where dedicated ACLs are implemented. The procedure of FIG. 7 determines whether the relation (u,a) is either explicitly or implicitly included in the grant relation (or in the pertinent atomic grant relation) specified in the server computer 302. Block 702 in FIG. 7 represents submission to the server computer 302 by a user u, such as a user described in connection with FIG. 6, of the request (u,a). At 704 it is determined whether the ACL of a is empty. If the ACL of a is not empty, then it is determined at 706 whether the requesting user u is included in the ACL of a. If so, then the requested action a is authorized (708). If not, the requested action a is not authorized (710).

If the ACL of a is empty, then it is determined at 712 whether the requesting user u is an unassigned user (i.e., it is determined whether u is included in any ACL (possibly any ACL of a group of relevant ACLs)). If user u is unassigned then the action a is authorized (708). However, if u is assigned to some ACL (or to some ACL of a relevant group of ACLs), then a is not authorized (710).

The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

If dedicated authorizations are implemented with dedicated permissions, checking whether the permission set of the requesting user is empty and whether the requested action is included in the permission set may be done in a straightforward manner, and do not present any particular problem. However, determining whether the requested action is not a dedicated action may present some difficulties in some cases since it may be necessary to search for the requested action in the permission sets for all users (or all relevant users). Such a search function may not be directly supported by the user administration facility, particularly when the permission sets are customized or application-specific.

On the other hand, implementing dedicated authorizations with dedicated ACLs may be comparatively convenient. Checking whether the ACL for the requested action is empty and whether the requesting user is included in the ACL again may be done in a straightforward manner. The task of checking whether the requested user is not included in any (relevant) ACL (e.g., any ACL maintained for the atomic grant relation) may in some embodiments be implemented as an enhancement to an administrative tool for the relevant objects.

In some embodiments, it may be particularly helpful to implement dedicated ACLs in an extension of a software system which provides exchange-based process integration. An example of such a software system is the Exchange Infrastructure (XI) software system available from SAP AG, which is the assignee hereof. Initially such an exchange-based software system may operate with an open authorization model. This may be appropriate for application to application (A2A) integration, in which internal application software programs may send messages to the integration server (e.g., server 302). The integration server 302 may transform the messages in an appropriate manner and route the transformed messages to the recipient application program. In such A2A integration it may be that the only authorization check is as to whether the sending user has overall permission to send a message to the integration server.

If it is proposed to extend the integration software system to business-to-business (B2B) messaging, further security considerations may come into play. In B2B messaging, other business systems which interact with the company that operates the integration server may be allowed to send messages to the integration server (e.g., over the Internet). Such messaging may be considered to raise security concerns not present with internal messaging, so that it may be advisable to implement a more restrictive authorization scheme. Dedicated ACLs may be very useful in this situation, as a way of overlaying additional security for B2B senders, while leaving the generally open model in place for internal senders.

More specifically, when an external B2B organization is to be given access to the exchange server, a dedicated ACL or ACLs may be used to list all dedicated users associated with the new external organization. These dedicated users may be considered B2B senders. In addition, a requirement may be put in place that any message from one of these users must contain the new organization's system name in the message. The dedicated ACL or ACLs may be maintained in a directory tool of the integration software system. The dedicated ACL or ACLs allow the new organization's dedicated message sending system for the integration server to be assigned to all possible users of the system in the new organization. At the same time, the new organization's dedicated users would be prevented from using A2A messaging, and the internal unassigned A2A systems would remain openly authorized to internal (unassigned) users.

In addition, if it were desired to extend stricter security to aspects of the internal A2A system, these aspects may, by use of dedicated ACLs, be assigned to dedicated internal users on a step-by-step basis.

In other embodiments, the semantics described above may be extended by defining a syntactical element (e.g., a symbol) that represents a generic permission to perform unassigned actions (in the case of a user) or generic permission to be performed by unassigned users (in the case of an action). For purposes of illustration, let the new syntactical element be " ∗ ".

The syntactical sets A∗ and U∗ can now be defined as $$A^* = A \cup \{*\}$$

$$U^* = U \cup \{*\}$$

Specification functions perm∗ and acl∗ may be defined as $$\text{perm}^*: U \rightarrow P(A^*)$$

$$\text{acl}^*: A \rightarrow P(U^*)$$

It is to be noted that perm∗(u) or acl∗(a) can be the empty set, meaning respectively that u has not been authorized to perform any actions or that a has not been authorized to be performed by any user; alternatively perm∗(u) or acl∗(a) may contain the ∗ element, indicating that a generic assignment of non-dedicated actions or users has been made.

The sets DA and CA may be defined for perm∗ as follows:

$$DA = \{a \in A \mid \exists u \in U \text{ with } a \in \text{perm}^*(u)\}$$

$$CA = A \setminus DA$$

Similarly, the sets DU and CU may be defined for acl* as follows:

$$DU = \{u \in U | \exists a \in A \text{ with } u \in \text{acl}^*(a)\}$$

$$CU = U \setminus DU$$

In addition the sets GU and GA may be defined as $$GU = \{u \in U | \star \in \text{perm}^*(u)\}$$

$$GA = \{a \in A | \star \in \text{acl}^*(a)\}$$

Now semantics for generic dedicated authorizations may be defined as follows:

$$[[\text{perm}]]_{ded} = [[\text{perm}]] \cup (GU \times CA)$$

$$[[\text{acl}]]_{ded} = [[\text{acl}]] \cup (CU \times GA)$$

In these embodiments, when the "$\star$" element is contained in a user's permission set then access is granted to all non-dedicated actions or when that element is contained in an object's ACL then access is granted to that object by all non-dedicated users, in addition, in either case to the access granted explicitly via [[perm]] or [[acl]].

With the wildcard indication, there may be greater flexibility in specifying grants. For example, if a user's permission set is empty, then (unlike the situation described with respect to FIG. 6) the user is not authorized to perform any actions. Similarly, if an object's ACL is empty, then (unlike the situation of FIG. 7) no user is authorized to access the object.

Moreover, the wildcard indication can be a vehicle for allowing a dedicated user to perform non-dedicated actions, or for allowing a dedicated action to be authorized for non-dedicated users.

If it is desired to duplicate the implicitly defined dedicated authorization approach described above and illustrated in exemplary fashion in FIG. 5, the following definitions may be employed so that $[[\text{acl}]]_{ded} = [[\text{acl}]]_{ded}$ and $[[\text{perm}]]_{ded} = [[\text{perm}]]_{ded}$:

When perm(u) is not empty, perm*(u)=perm(u).
When perm(u) is empty, perm*(u)={ $\star$ }
When acl(a) is not empty, acl*(a)=acl(a).
When acl(a) is empty, acl*(a)={ $\star$ }

There will now be described algorithms for checking actual authorization grants when dedicated authorizations with the extended semantics are implemented with either dedicated permissions or dedicated ACLs.

Figure 9:
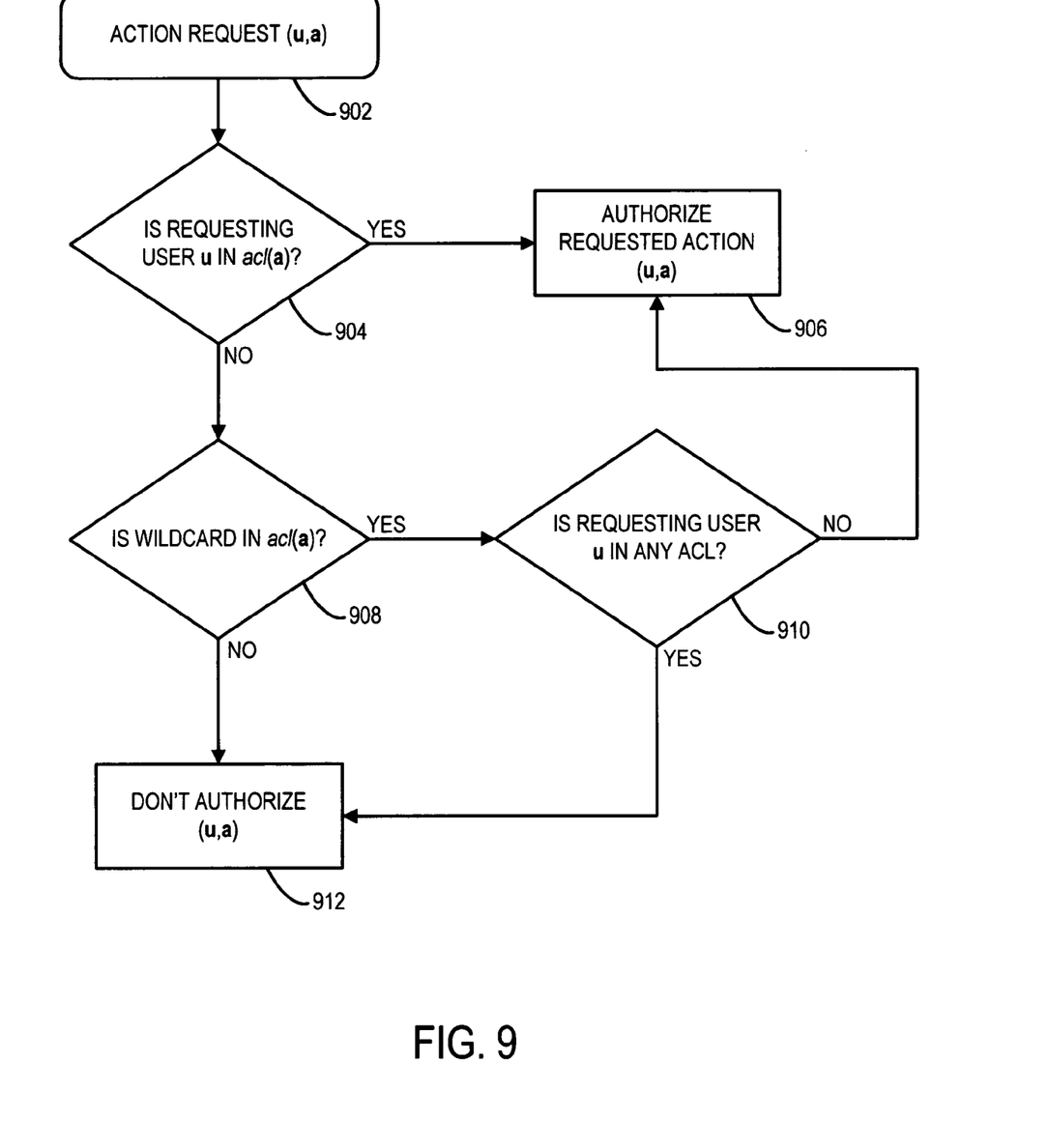
FIG. 9 is a flow chart that illustrates a process performed in the computer system of FIG. 3 in accordance with other embodiments.

FIG. 9 is a flow chart that illustrates a procedure for determining whether action a requested by user u is authorized in the case where dedicated permissions with the extended semantics are implemented.

Figure 8:
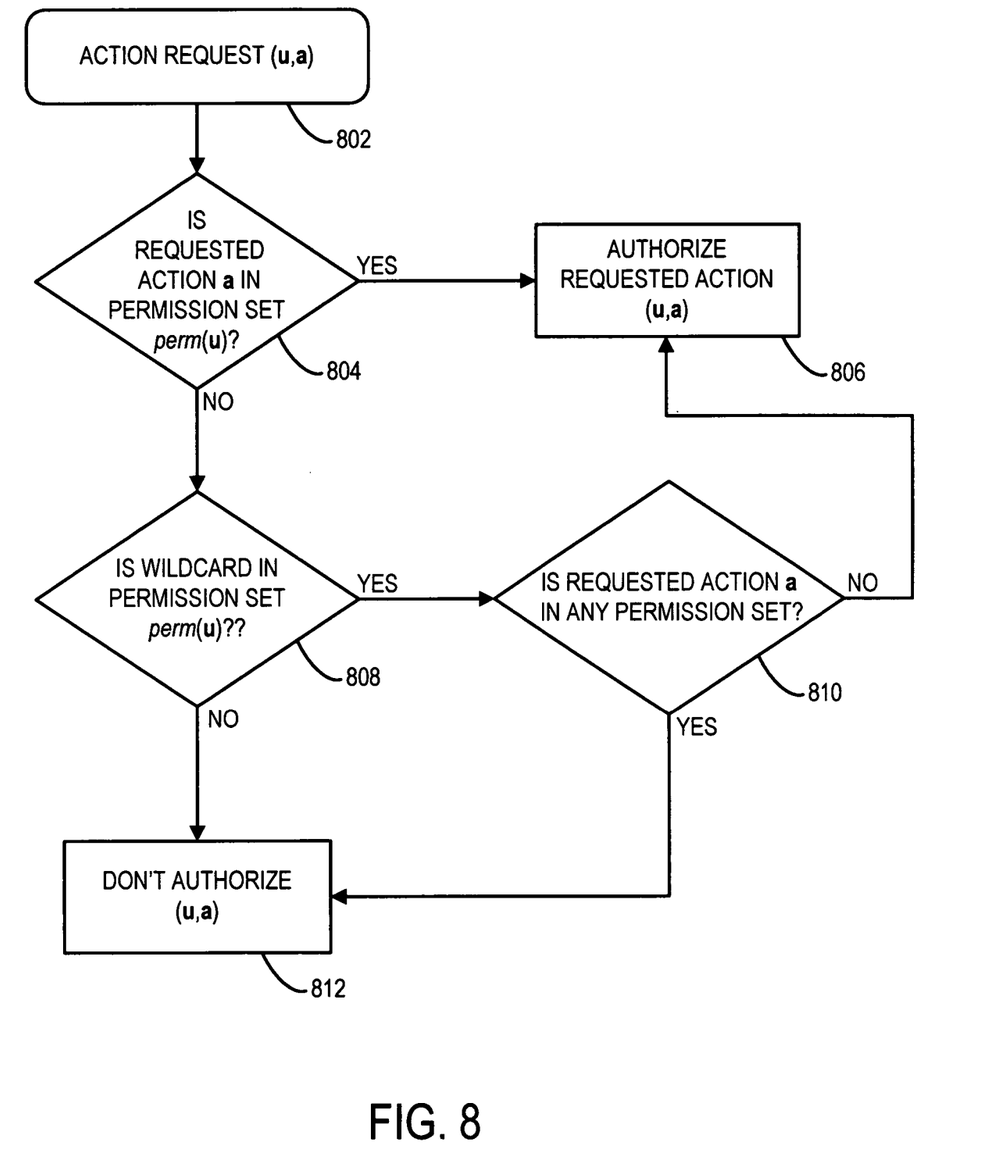
FIG. 8 is a flow chart that illustrates a process performed in the computer system of FIG. 3 in accordance with some embodiments.

Block 802 in FIG. 8 represents submission to the server computer 302 by a user u (of the types or by the methods described above) of the request (u,a). At 804 it is determined whether the requested action a is included in the permission set of u. If so, then the requested action a is authorized (806). If not, it is determined at 808 whether the wildcard designation (e.g., " $\star$ ") is included in the permission set of u. If at 808 it is determined that the wildcard designation is included in the permission set of u, then at 810 it is determined whether the requested action a is an unassigned action (i.e., it is determined whether a is a member of any permission set (possibly any set of a group of permission sets)). If a is unassigned then the requested action a is authorized (806). However if a is assigned to some permission set (or some permission set of a relevant group of permission sets) or if the wildcard designation is not included in the permission set of u, then a is not authorized (812).

FIG. 9 is a flow chart that illustrates a procedure for determining whether action a requested by user u is authorized in the case where dedicated ACLs with the extended semantics are implemented.

Block 902 in FIG. 9 represents submission to the server computer 302 by a user u (of the types or by the methods described above) of the request (u,a). At 904 it is determined whether the requesting user u is included in the ACL of a. If so, then the requested action is authorized (906). If not, it is determined at 908 whether the wildcard designation is included in the ACL of a. If at 908 it is determined that the wildcard designation is included in the ACL of a, then at 910 it is determined whether the requested user is an unassigned user (i.e., it is determined whether u is included in any ACL (possibly any ACL of a group of relevant ACLs)). If u is unassigned then the requested action a is authorized (906). However if u is assigned to some ACL (or some ACL of a relevant group of ACLs) or if the wildcard designation is not included in the ACL of a, then a is not authorized (912).

A "wildcard designation" need not be the "$\star$" character; rather a wildcard designation is any symbol included in a permission set to indicate that the corresponding user is authorized to perform any unassigned action or any symbol included in an ACL to indicate that any unassigned user is authorized to perform the corresponding action.

As used herein and in the appended claims, a group of ACLs need not include more than one ACL, and a group of permission sets need not include more than one permission set.

The embodiments described herein are solely for the purpose of illustration. Those skilled in the art will recognize other embodiments may be practiced with modifications and alterations limited only by the claims.

What is claimed is:

1. A method of using access control lists (ACLs) and an authorization model to determine whether to authorize a user to perform an action requested by the user, the method comprising:

storing a plurality of ACLs in a storage device, each individual ACL of the plurality of ACLs being dedicated to a respective one of a plurality of actions and having zero or more users that are assigned to the individual ACL and are explicitly authorized to perform the action to which the individual ACL is dedicated;

receiving, by a processor that is coupled to the storage device and coupled to a communication device, a request from a user to perform one of the plurality of actions;

if there are not zero users assigned to the ACL dedicated to the one of the plurality of actions, authorizing, by the processor, the user to perform the one of the plurality of actions only if the user is assigned to the ACL dedicated to the one of the plurality of actions; and if there are zero users assigned to the ACL dedicated to the one of the plurality of actions, authorizing, by the processor, the user to perform the one of the plurality of actions only if the user is assigned to none of the plurality of ACLs each individual ACL of which is dedicated to a respective one of a plurality of actions and has zero or more users that are assigned to the individual ACL and explicitly authorized to perform the action to which the individual ACL is dedicated.

2. The method of claim 1, wherein the user is a business-to-business sender and the one of the plurality of actions is sending a message to an application integration software component.

3. The method of claim 1, wherein the one of the plurality of actions is accessing an object.

4. The method of claim 1, wherein it is determined whether the user is assigned to none of the plurality of ACLs by searching for the user among all ACLs for an atomic grant relation.

5. A non-transitory computer readable medium having instructions stored thereon, the instructions executable by a machine to result in a method comprising:
- storing a plurality of ACLs in a storage device, each individual ACL of the plurality of ACLs being dedicated to a respective one of a plurality of actions and having zero or more users that are assigned to the individual ACL and are explicitly authorized to perform the action to which the individual ACL is dedicated;
- receiving a request from a user to perform one of the plurality of actions;
- if there are not zero users assigned to the ACL dedicated to the one of the plurality of actions, authorizing the user to perform the one of the plurality of actions only if the user is assigned to the ACL dedicated to the one of the plurality of actions; and
- if there are zero users assigned to the ACL dedicated to the one of the plurality of actions, authorizing the user to perform the one of the plurality of actions only if the user is assigned to none of the plurality of ACLs each individual ACL of which is dedicated to a respective one of a plurality of actions and has zero or more users that are assigned to the individual ACL and explicitly authorized to perform the action to which the individual ACL is dedicated.

6. The medium of claim 5, wherein the user is a business-to-business sender and the one of the plurality of actions is sending a message to an application integration software component.

7. The medium of claim 5, wherein the one of the plurality of actions is accessing an object.

8. The medium of claim 5, wherein it is determined whether the user is assigned to none of the plurality of ACLs by searching for the user among all ACLs for an atomic grant relation.

9. Apparatus comprising:
a memory; and
a processor that is in communication with the memory and to:
- store a plurality of ACLs in a storage device, each individual ACL of the plurality of ACLs being dedicated to a respective one of a plurality of actions and having zero or more users that are assigned to the individual ACL and are explicitly authorized to perform the action to which the individual ACL is dedicated;
- receive a request from a user to perform one of the plurality of actions;
- if there are not zero users assigned to the ACL dedicated to the one of the plurality of actions, authorize the user to perform the one of the plurality of actions only if the user is assigned to the ACL dedicated to the one of the plurality of actions; and
- if there are zero users assigned to the ACL dedicated to the one of the plurality of actions, authorize the user to perform the one of the plurality of actions only if the user is assigned to none of the plurality of ACLs each individual ACL of which is dedicated to a respective one of a plurality of actions and has zero or more users that are assigned to the individual ACL and explicitly authorized to perform the action to which the individual ACL is dedicated.

10. The apparatus of claim 9, wherein the user is a business-to-business sender and the one of the plurality of actions is sending a message to an application integration software component.

11. The apparatus of claim 9, wherein the one of the plurality of actions is accessing an object.

12. The apparatus of claim 9, wherein it is determined whether the user is assigned to none of the plurality of ACLs by searching for the user among all ACLs for an atomic grant relation.

* * * * *